INVENTORS
HAROLD E. ELLER &
BY HUBERT DRECKMANN

Eugene C. Knoblock
ATTORNEY

United States Patent Office 3,504,273
Patented Mar. 31, 1970

3,504,273
FLUID BRIDGE METHOD AND MEANS OF DETECTING GASES HAVING MAGNETIC SUSCEPTIBILITY
Harold E. Eller and Hubert Dreckmann, Michigan City, Ind., assignors to The Hays Corporation, Michigan City, Ind.
Filed Jan. 9, 1968, Ser. No. 696,527
Int. Cl. G01r 33/00; G01n 27/72
U.S. Cl. 324—36                7 Claims

ABSTRACT OF THE DISCLOSURE

A method and means for detecting a gas having magnetic susceptibility wherein magnetic winds of the same magnitude but acting in opposite directions are created by the conjoint action of magnets and heating means upon two similar streams of a sample gas so as to create a pressure difference in said streams which is detected by sensing gas flow between said streams. A second gas is introduced into said streams downstream from said detecting point in proportions determined by the gas flow between said streams.

---

Figure 1:
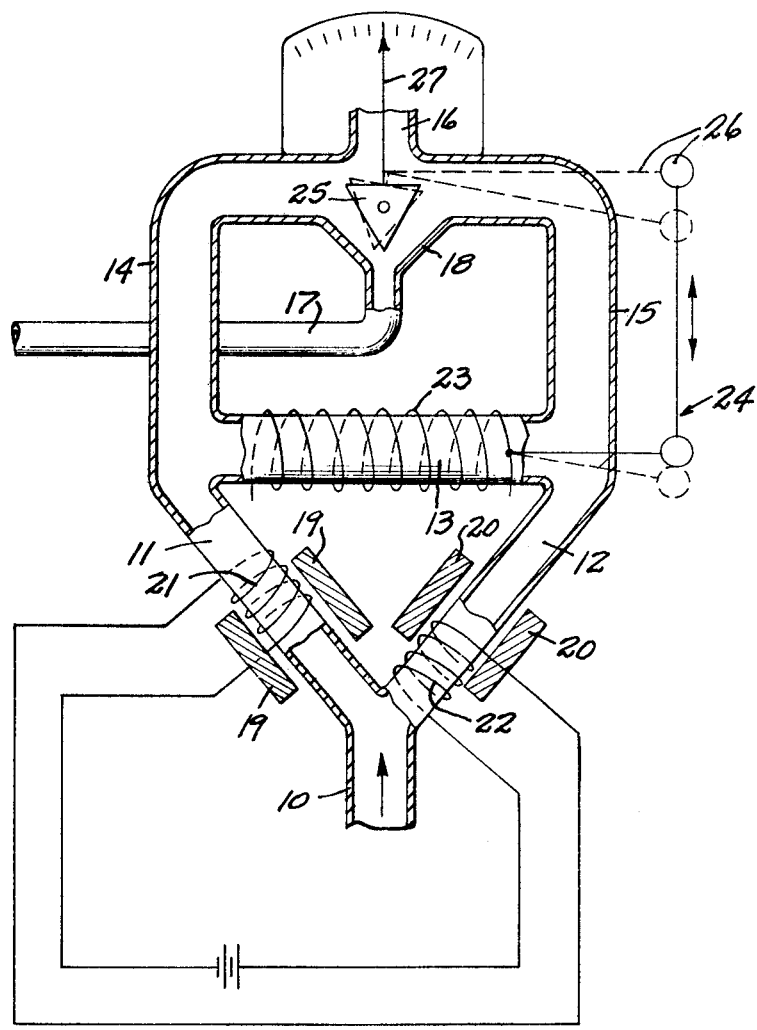

This invention relates to improvements in method and means of detecting gases having magnetic susceptibility, such as oxygen.

Various types of devices have been developed heretofore to utilize the unique magnetic properties of oxygen and other gases having magnetic susceptibility in apparatus for determining the concentration of such a gas in a gas mixture. In one type of prior apparatus commonly referred to as a paramagnetic detector the apparatus measures either the force exerted by a magnetic field upon a volume of subject gas or the pressure exerted by a volume of subject gas attracted to a magnetic field. Examples of paramagnetic detectors are to be found in U.S. Patents 2,416,344, 2,666,893 and 3,026,472. The paramagnetic detectors have one substantial disadvantage in common in that they are affected by the diamagnetism of the background gases and must be compensated for such effects in order to achieve accurate results.

Another prior type of apparatus is known as an inductive detector. Apparatus of this character measures the magnetic permeability of a gas which is related to the magnetic susceptibility of the gas according to:

$$X = 1 + 4Y$$

where X equals permeability and Y equals susceptibility. Examples of inductive detectors are to be found in U.S. Patents 2,467,211, 2,930,970, 3,049,665 and 3,076,929. The inductive detectors of this type, like the paramagnetic detectors, are affected by the diamagnetism of the background gases.

Another type of detector utilizing the magnetic properties of a subject gas is known as a thermal magnetic detector. Thermal magnetic detectors measure pneumatic and/or thermal effects caused by a so-called magnetic wind generated therein and proportional to the gas of magnetic susceptibility. Examples of thermal magnetic detectors are to be found in U.S. Patents 2,603,964, 2,763,151, 2,815,659 and 3,045,474. Most thermal magnetic detectors are not affected by the diamagnetism of the background gases, but they are affected to varying degrees by other physical parameters of background gases such as the thermal conductivity, the density, the viscosity or the heat capacity of the background gases, or combinations of such parameters one special type of thermal magnetic detector, shown in German Patent No. 1,181,-945 and French Patent No. 1,336,252, is affected by physical parameters such as thermal conductivity, density, viscosity and heat capacity of the gas to only a slight extent, but is affected by the diamagnetism of the background gases.

Another type of prior apparatus may be referred to as a divided path differential pressure detector. Such an apparatus is shown in U.S. Patent 3,191,425 and requires the use of moving or rotatable magnets and other structural characteristics which render them complicated and expensive.

It is the primary object of this invention to provide a simple and inexpensive oxygen detector which requires a minimum number of parts to produce highly accurate results which are substantially free from the effects of the properties and parameters of background gases.

A further object is to provide a method of this character wherein a sample gas being measured is divided into two flows or streams in which magnets and heating means generate magnetic winds, one of which enhances gas flow from an inlet to an outlet and the other of which retards gas flow from inlet to outlet, thereby creating a pressure differential across the two paths which is measured and the measuring force of which is utilized to proportion the supply of an auxiliary gas to the two sample flows near the outlet in a manner to neutralize the pressure differential, said measurement being a function of the amount of the subject gas in the gas sample.

A further object is to provide a device of this character wherein a differential pressure between two separate gas flows or a sample gas is generated as a function of the percentage of a gas of magnetic susceptibility and independent of the characteristics of the background gases.

Other objects will be apparent from the following specification.

In the drawing:

FIG. 1 is a schematic view of apparatus constituting an embodiment of this invention.

The method of this invention may be performed by the use of the apparatus illustrated in FIG. 1. By this method a sample gas is divided into two streams flowing through passages of the same size, length and shape to an outlet, which passages are open into communication at a cross passage intermediate their ends. Magnetic winds of the same value but acting in opposite directions are generated in said passages by subjecting the gas flow in each to the flux field of a magnet and to the action of heating means adjacent to and projecting in different directions from said magnets in the respective passages. The pressure difference resulting from the actions of said differently directed magnetic winds is detected by sensing the existence of gas flow in said cross passage and generating a signal. A second gas is supplied adjacent to said two passages downstream from said detection point and is proportioned to said two passages in response to the signal generated by said detecting means.

Referring to the drawing which illustrates the preferred embodiment of the invention, the numeral 10 designates an inlet passage through which is supplied a gas sample whose oxygen component is to be measured. Similar passages 11 and 12 diverge or branch from the inlet conduit 10. A transverse passage 13 connects the branch passages 11 and 12, and passage portions 14 and 15 form continuations of the branch conduits 11 and 12, respectively, extending past the transverse passage 13 and converging to communicate with an outlet 16. The passage portions 11, 14 are substantially similar to the passage portions 12 and 15 in length, shape and cross sectional dimension. A conduit 17 connected with a supply of an auxiliary gas communicates with the passages 14 and 15 at a junction portion 18 which preferably flares at its discharge or communication connection with the passage portions 14 and 15.

Each of the branch passages 11 and 12 is positioned between the pole pieces of one of a pair of similar magnets 19 and 20 which are similarly positioned, that is, the magnets 19 and 20 are spaced equally from the inlet 10 and from the transverse conduit 13, are preferably oriented in the same plane and are provided with equal or similar air gaps. Magnets 19 and 20 are preferably permanent magnets, but may be electromagnets energized by either direct current or alternating current. The branch passages 11 and 12 are preferably defined by conduits formed of the same material, such as glass or stainless steel. A heater winding 21 of electric resistance wire acts upon the gas flowing in a portion of the branch conduit 11 adjacent to the associated magnet 19 but out of register with or projecting beyond the magnet 19 in a downstream direction. A heater winding 22 similar to the winding 21 acts upon the gas flowing in the branch conduit 12 in similar out-of-register arrangement to the associated magnet 20, but extending in an upstream direction from said magnet. The heater windings 21 and 22 may either encircle the associated passages 11 and 12 or may be positioned within said passages, and they are connected to the same current source or to current sources of equal value.

The transverse passage 13 has associated therewith a flow detector 23 responsive to the flow of gas therein. The flow detector 23 is preferably of the sensitive hot wire type in which a heated coil is positioned within or encircles the transverse passage. The resistance of the coil varies as it cools in response to flow of gas in passage 13. The signal generated in the flow detector is fed to a servo mechanism of any suitable type, and preferably constituting a signal amplifier, an indicator and a power operated positioning member.

A flow dividing member 25 is positioned at the outlet of the auxiliary gas conduit 17 and is shiftable in a manner to regulate or vary the proportion of gas flowing toward the discharge ends of passages 14 and 15 respectively. Thus, the flow dividing member may be pivoted on an axis aligned with the outlet of the auxiliary gas conduit and may be of such shape and so positioned that rotation thereof clockwise as viewed in FIG. 1 will restrict flow of auxiliary gas from the auxiliary gas conduit 17 toward the passage 14 without restricting substantially the flow of auxiliary gas toward the passage 15. Similarly upon counterclockwise rotation of the flow dividing member 25 as seen in FIG. 1 the flow of auxiliary gas from the conduit 17 toward the passage 15 is restricted without substantial restriction of the flow of auxiliary gas toward the passage 14. The servo mechanism includes a connection 26 between the power operated positioning member thereof and the flow divider 25, which causes adjustment or change of the position of the flow dividing member 25 proportionally to and in a direction as sensed by the flow detector 23 and tending to equalize the pressure in the passages 14 and 15 so as to neutralize the differential pressure in the transverse passage. The servo mechanism preferably includes an indicator 27 whose position may be read upon a scale calibrated to be read in terms of the percentage of oxygen or other gas having magnetic susceptibility which is contained in the sample gas.

In the operation of the device, the sample gas is divided from inlet 10 to flow into passages 11 and 12 in its flow toward the outlet 16. The magnet 19 and its correlated heater winding 21 cooperate to generate a magnetic wind in the sample gas as it flows through branch conduit 11 toward the outlet 16, which magnetic wind acts in a direction toward the outlet, thereby accelerating the sample gas flow through passages 11 and 14. The magnet 20 and the heater winding 22 cooperate to generate a magnetic wind in the sample gas flowing through the passages 12 and 15. The magnetic wind generated in passage 12 is equal in magnitude to the magnetic wind generated in the passage 11 but acts in opposite direction, that is, the magnetic wind created in the passage 12 acts in a direction toward the inlet 10 and, hence, counter to the path of flow of gas in passage 12 from the inlet 10 to the outlet 16. Consequently, the magnetic wind produced in the passage 12 by the magnet 20 and the heater 22 impedes the sample gas flow in said passage from inlet 10 to outlet 16.

The acceleration of gas flow in passages 11, 14 and the impeding of gas flow in the passages 12 and 15 creates a pressure differential across the transverse passage. The sample gas flow in the transverse conduit activates the flow detector 23 and causes the detector to activate or position the associated servo mechanism 24. The servo mechanism 24 acts through its connection 26 with the flow dividing member 25 to alter the position of the latter in a manner to vary the proportions of auxiliary gas admitted to passages 14 and 15 from the auxiliary gas conduit 17 in a manner as to compensate for and neutralize the differential pressure condition existing in said passages 14 and 15 and across the transverse passage 13 to stop flow in passage 13.

Thus, whenever the percentage of the paramagnetic gas in the gas sample varies, the amount and strength of the magnetic wind generated in each of the two passages 11 and 12 will vary and the differential pressure across the transverse passage 13 will vary, which produces a response of the detector 23. The functioning of the servo mechanism in response to the flow detector adjusts the flow dividing member 25 in such a manner as to stop flow in cross passage 13 for as long a period as the percentage of the paramagnetic component of the sample gas passing the respective magnetic systems 19, 21 and 20, 22 remains constant. Upon a change in the percentage of the paramagnetic gas and a resulting change in the magnetic wind, the differential pressure across the transverse passage 13 varies and activates the flow detector accordingly, causing the servo mechanism to take a new setting for proportional repositioning of the flow dividing member 25 and the indicator 27.

The arrangement of the magnetic wind generating systems 19, 21 and 20, 22 in opposed relation in different branch passages of the flow path in this device serves the following functions: (a) it cancels the diamagnetic effects of the sample gas; (b) it cancels chimney effects in the system; and (c) it doubles the magnetic wind effect.

It will be noted that the arrangement renders the flow detector 23 a null detector which is effective only to detect the difference between flow and no-flow in the transverse passage. Consequently, the function of flow versus the electrical signal from the flow detector and the same effects of the sample gas composition upon these functions are not determinative of the output characteristics of the device.

It will be observed also that the servo mechanism 24 in its control of the flow dividing member 25 serves only to proportion the flow of an auxiliary gas of a defined composition at the passages 14 and 15, and it has no effect in proportioning the flow of the sample gas with its potential background composition changes. Therefore, the balance position of the servo mechanism 24 is determined solely by the oxygen concentration of the gas and is not affected by the background gas composition.

While the preferred embodiment of the invention has been illustrated and described, it will be understood that modifications of the apparatus and the method embodying this invention may be made without departing from the spirit of the invention.

I claim:

1. The method of detecting a gas of magnetic susceptibility contained in a sample gas consisting of the steps of
dividing a flow of a sample gas from an inlet to an outlet in two similar paths having a communicating connection between said inlet and outlet;

generating at a predetermined point between said inlet and connection in one of said flow paths a magnetic wind acting in a direction toward said outlet;

generating in the other flow path at a point similar to the generating point in said first flow path a magnetic wind equal in magnitude to the first named magnetic wind and acting in a direction counter to the direction of flow of the sample gas in said other flow path; and detecting at said communicating connection the difference in pressure in said flow paths between said respective generating points and said outlet.

2. The method of gas detection consisting of the steps of directing two equal portions of a gas sample in similar paths from an inlet to an outlet, establishing a communication path between said first paths intermediate the length thereof, generating in the portion of one of said first flow paths between said inlet and said communication path a magnetic wind acting in a direction toward said outlet, generating in the portion of the other of said first flow paths between said inlet and said communication path a magnetic wind equal to said first named magnetic wind and acting in a direction toward said inlet, detecting the differential pressure in said communication path, supplying an auxiliary gas different from said gas sample to said flow paths downstream from said communication path, and proportioning the flow of auxiliary gas to said respective flow paths in a manner to counterbalance said detected differential pressure.

3. The method of claim 1, wherein said magnetic wind is generated by subjecting gas flow in each path to the magnetic flux field of a magnet and heating the gas flow adjacent to said field but partially displaced longitudinally of the path in selected direction.

4. Means for detecting a component of a gas sample which has magnetic susceptibility comprising means defining two similar sample gas flow passages between an inlet and an outlet and a cross passage connecting said flow passages intermediate their length, magnets having pole pieces positioned to generate similar magnetic fields at similar positions along said first passages between said inlet and said cross passage, a heater coil for heating gas in one of said first passages and positioned in selected orientation to and offset in upstream direction from the magnet acting on said passage, a heater coil similar to said first named coil for heating gas in the other of said first flow passages and positioned in the same orientation as said first coil but offset in downstream direction from the magnet acting on said other passage, and differential pressure responsive means sensing the rate of gas flow in said cross passage.

5. Gas detecting means as defined in claim 4, and means for supplying to said flow paths adjacent said outlet a second gas different from said sample gas in proportions controlled by said differential pressure responsive means and adequate to equalize the pressures in said flow paths.

6. Means for detecting a component of a gas sample which has magnetic susceptibility as defined in claim 5, and servo mechanism responsive to said differential pressure responsive means and controlling the flow of said second gas.

7. Means for detecting a component of a gas sample which has magnetic susceptibility as defined in claim 6, wherein an adjustable flow dividing member is positioned between said flow paths adjacent said outlet and is shiftable by said servo mechanism to divide said second gas in different proportions between said flow paths.

References Cited

UNITED STATES PATENTS

| | | | |
|---|---|---|---|
| 3,302,448 | 2/1967 | Mocker | 73—23 |
| 3,240,051 | 3/1966 | Lenfant | 324—36 XR |

ALFRED E. SMITH, Primary Examiner

U.S. Cl. X.R.

73—23